March 7, 1967  G. L. BAUMGARTNER, JR  3,308,009
CURL-RESISTANT VINYL CORK TILE
Filed Dec. 16, 1963
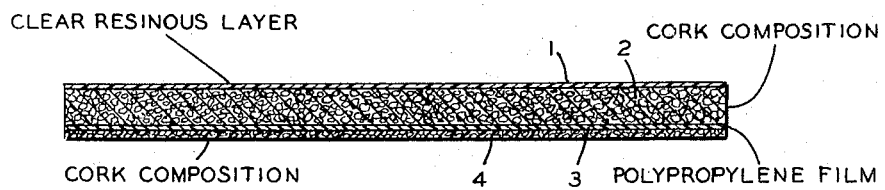
INVENTOR.
GEORGE L. BAUMGARTNER, JR.
BY 3,308,009
CURL-RESISTANT VINYL CORK TILE
George L. Baumgartner, Jr., 635 Hedgerow Lane, Manheim Township, Lancaster County, Pa. 17601
Filed Dec. 16, 1963, Ser. No. 330,879
5 Claims. (Cl. 161—211)

This invention relates to cork tile, and more particularly to curl-resistant cork tile having a clear resinous wear layer on the face thereof and a combination vapor barrier and curl control film of polypropylene embedded in the body of the tile close to its back surface.

Cork tile is normally formed of cork granules which are coated with a binder, compressed in a mold, and heated to activate the binder. The formed mass is then severed into sheets which are subsequently cut into pieces of the desired size and configuration. Cork tile is used primarily as a surface covering on floors and walls, as well as on furniture tops, counter tops, and other places where surface coverings are applied.

In order to protect the surface of cork tile intended for use as a surface covering, it has been common practice to place a film or sheet of either plasticized or unplasticized vinyl chloride-vinyl acetate copolymer over the cork composition and subject the same to heat and pressure sufficient to fuse the plastic sheet onto the surface of the cork particles. One of the advantages of using a vinyl chloride-vinyl acetate copolymer film fused onto the surface of the cork particles is derived from the fact that such film offers practically no resistance or impedance to the passage of optical rays, and the appearance of the natural cork composition is enhanced rather than detracted by the vinyl film. These face-coatings, however, upon cooling, tend to contract causing an upward curling of the edges of the tile.

The need for counteracting the shrinking tendencies of face coatings on surface coverings has been recognized in the past and shrinkable back coatings have been suggested therefor. For example, in connection with felt base flooring material having a polymerized vinyl resin on the face thereof, U.S. Patent 3,007,808 proposes use of a shrinkable back coating to counteract the face curl problem. Another shrinkable back coating for resilient floor and wall covering is proposed in U.S. Patent 3,095,318.

It is well known that swelling and curling of cork tile also results from moisture picked up from the atmosphere, or the base upon which it is installed. Since the face of the cork floor or wall covering is normally sealed against moisture by the surface coating thereon, and the back of the tile is not, the back of the tile will pick up moisture causing swelling of the cork with resultant curling upwardly of the tile at the edges.

It is conventional practice when installing cork tile surface covering to apply a layer of adhesive to the surface to be covered and, while the adhesive is wet, to press the individual pieces of cork tile into the adhesive. The solvents which are customarily used in these adhesives, generally either water or alcohol, penetrate the back of the cork tile, to a limited extent at least, resulting in swelling of the cork particles into which the solvent penetrates. Since the faces of the tiles are not exposed to the adhesive solvent and also may be restrained from expanding by the finish or face coating thereon, an upward curl of the tile edges results. The force of this curl is of considerable magnitude and may be sufficient to overcome the initial tack of the adhesive used to install the tile. When this occurs, so-called peaked seams result where adjacent pieces of cork tile abut. This necessitates rerolling of the cork tile after the adhesive has developed sufficient tack to withstand the force of curling. If this is not done the floor will be unsightly and difficult to maintain.

In view of the foregoing, it would seem that the ideal solution to this problem would be to completely encase or envelop the cork composition tile in a vinyl film. However, this increases the problem of adhering the material to the floor. The conventional adhesives used to adhere cork composition floor and wall coverings to various subbases are not suitable for adhering vinyl films to subbases. While it is true that certain adhesives which will adhere vinyl films have been developed, the holding power of these adhesives is excessive for the purpose here intended in that the bond is so great that the floor covering cannot be removed. Because of the increasing trend for redecoration after a certain period of time, it is desirable to utilize adhesive systems which will hold a floor covering or a wall covering firmly in place but which can be broken without too much effort so that the material can be removed to facilitate conditioning the base for a subsequent installation of new covering material. For this reason, adhesives which are known to hold the vinyl type surfaces are not suitable for adhering decorative coverings such as cork to a base.

In order to overcome this problem, it has been found desirable to produce a cork tile having a vapor barrier positioned in the body of a resilient cork composition body as close to the back surface as conveniently possible. This reduces to a minimum the amount of cork which will be receptive to moisture, and this volume of cork so exposed will not be great enough to have any ill effects on the over-all body of the tile. With this system the exposed cork backing will also permit bonding of the tile to a base by means of conventional adhesives.

The present invention takes advantage of the fact that the shrinkage of a film of polypropylene affixed to a vinyl faced cork tile is substantially greater than that of the faced cork tile when cooling from elevated manufacturing temperatures. Thus, a built-in tndency toward reverse curling is provided in a faced cork tile by including therein a combined embedded vapor barrier and curl control film of polypropylene located as close to the back of the tile as possible. Bonding of the tile to the floor by conventional adhesives is not adversely affected by the film since the bond is between the back cork surface of the tile and the supporting surface. Actually the film aids in maintaining the bond by holding the tile flat so there is no tendency for it to pull away or curl toward the wear layer. As previously stated, the relatively small amount of cork on the back of the tile may be receptive to a small amount of moisture, however it will not be in an amount sufficient to have any over-all dimensional effects on the cork tile body.

An object of the present invention is to provide a cork tile which may be satisfactorily bonded to a surface to be covered, by any of the conventional adhesives, without danger of failure of the bond due to curling of the tile toward the wear coating. Another object of the invention is to provide a floor and wall covering having a plasticized or unplasticized wear layer and an impervious curl control-vapor barrier embedded close to the back surface thereof. A still further object is to provide a shrinkable polypropylene vapor barrier in the cork tile to overcome tendencies of the tile to curl toward its face.

According to the present invention, elimination of curling or vinyl faced cork tile is accomplished by forming a composite molded product consisting of a vinyl wear surface on the main body of the cork tile composition, a polypropylene film on the back of the cork tile composition, and a thin layer of cork composition over the polypropylene fi'm.

The accompanying drawing is a simplified illustration to an exaggerated scale of the floor and wall covering of this invention, wherein there is shown a clear resinous wear layer 1 on a main body of cork composition 2, to the back of which is attached, by means of a polypropylene film 3, a final thin layer of cork composition 4.

In forming the floor and wall covering of this invention, the laminae are molded under heat and pressure to fuse the wear layer 1 to the main body of cork composition 2 and adhere the thin layer of cork composition 4 to the main body 2 by means of the polypropylene film 3. Upon removal of the composite article from the mold, the consequent contraction of the polypropylene film upon cooling from the elevated molding temperatures counteracts the shrinkage of the decorative wear layer and keeps the tile flat. The polypropylene film also serves as a vapor barrier to eliminate absorption by the cork tile of moisture and solvents from the adhesives used when installing the tile. Because the curl-controlling polypropylene vapor barrier is embedded in the back of the tile with the thin cork backing layer exposed, the usual difficulty experienced in obtaining a good bond when adhesively securing the tile to the surface to be covered is not experienced. The usual tendency for the tile to curl upwardly is eliminated and the need for re-rolling the tile to flatten out the peaked seams, etc., and difficulty in maintenance is avoided.

Since the polypropylene film used as the combination vapor barrier and curl control means shrinks substantially more than the vinyl resin used on the face of the tile under the same conditions, a relatively thin film of polypropylene embedded in the cork tile will compensate for a relatively thick film or series of films of vinyl resin on the face of the tile. Furthermore, the thickness of the polypropylene film can be adjusted to yield the desired compensating factor, with thicker polypropylene films exerting greater compensating forces. However, in the manufacture of cork tile such as that of the present invention, the film of polypropylene never need be very thick and will be in the range of 0.001–0.005 inch in thickness with the most usual thickness being 0.002. Thicknesses of the various uncompressed components of the cork tile will often run about 0.005–0.030 inch for the top vinyl layer, about 0.125–0.140 inch for the cork tile composition layer and about 0.030–0.040 inch for the cork backing layer.

Examples of plasticized or unplasticized vinyl resins contemplated for use as the facing layer are selected from the group consisting of polyvinyl chloride, vinyl chloride-vinyl acetate copolymers, poly lower-alkyl acrylates, poly lower-alkyl methacrylates and copolymers of said acrylates and methacrylates.

By way of example, I have found that a suitable tile can be produced by using a body of cork composition approximately .125 inch thick. A plasticized vinyl wear film is placed on the surface of this material, and experience has shown that desirable results can be obtained utilizing a wear film ranging between .005 inch and .030 inch. The amount of plasticizer in the wear layer composition will be in the amount of 0 to 100 parts by weight of the usual plasticizers for vinyl resin, such as dioctyl phthalate based on the weight of resin. On the back of the cork composition there is placed a thin film of polypropylene of a thickness of from .001 inch to .005 inch, and on the back of this film there is disposed a very thin layer of cork composition in the range of from .030 inch to .040 inch. When this combination is placed in a mold and subjected to heat and pressure, the vinyl wear surface fuses onto the surface of the cork tile body; and the thin polypropylene vapor barrier-curl control film will fuse onto the back of the cork tile body and also onto the thin cork composition backing. This forms a final product .125 inch thick in which the main cork composition body is protected from penetration of moisture thereinto as well as being restrained from warping by the reverse curl effect of the polypropylene film. Good bonding of the tile to a subbase by conventional adhesives is assured by the thin layer of cork composition on the back thereof.

It will be obvious to those skilled in the art that by practicing the invention herein set forth it is possible to provide a cork tile composition which not only has a protective wear-resistant and soil-resistant surface coating but also has a vapor barrier-curl control film close to the back of the tile to prevent warping whether caused by passage of moisture, etc., into the body of the cork or shrinking of the facing layer, all accomplished without sacrificing the desirable bonding advantage afforded by the cork backing on the tile.

I claim:

1. A curl-resistant floor and wall covering comprising a main body of cork composition having a wear layer of polymerized vinyl resin affixed to the upper surface thereof, a film of polypropylene disposed on the back surface of said main body of cork composition, a thin layer of cork composition positioned on the side of said polypropylene film opposite the side attached to said main body of cork composition, said thin layer of cork composition being adhered to said main body of cork composition by said film of polypropylene.

2. A floor and wall covering according to claim 1 wherein the wear layer is a plasticized polymerized vinyl resin.

3. A floor and wall covering product according to claim 1 wherein said polymerized vinyl resin is selected from the group consisting of polyvinyl chloride, vinyl chloride-vinyl acetate copolymers, poly lower-alkyl acrylates, poly lower-alkyl methacrylates, and copolymers of said acrylates and methacrylates.

4. A floor and wall covering product according to claim 1 wherein said film of polypropylene is in the range of 0.001–0.005 inch thick.

5. A floor and wall covering product according to claim 1 wherein said thin layer of cork composition is in the range of 0.030–0.040 inch thick.

References Cited by the Examiner

UNITED STATES PATENTS

| | | | |
|---|---|---|---|
| 2,724,665 | 11/1955 | Oransky et al. | 117—68 |
| 2,852,412 | 9/1958 | Hassel | 117—68 |
| 3,007,808 | 11/1961 | Smith | 117—140 |
| 3,095,318 | 6/1963 | Petzold | 117—140 |

ALFRED L. LEAVITT, *Primary Examiner.*

A. ROSENSTEIN, *Assistant Examiner.*